May 27, 1958 W. D. CALDWELL 2,836,023
FORAGE HARVESTER CUTTING MECHANISM
Filed June 30, 1953 3 Sheets-Sheet 1

INVENTOR.
Walter Dwight Caldwell
BY
Olson & Trexler
Attys.

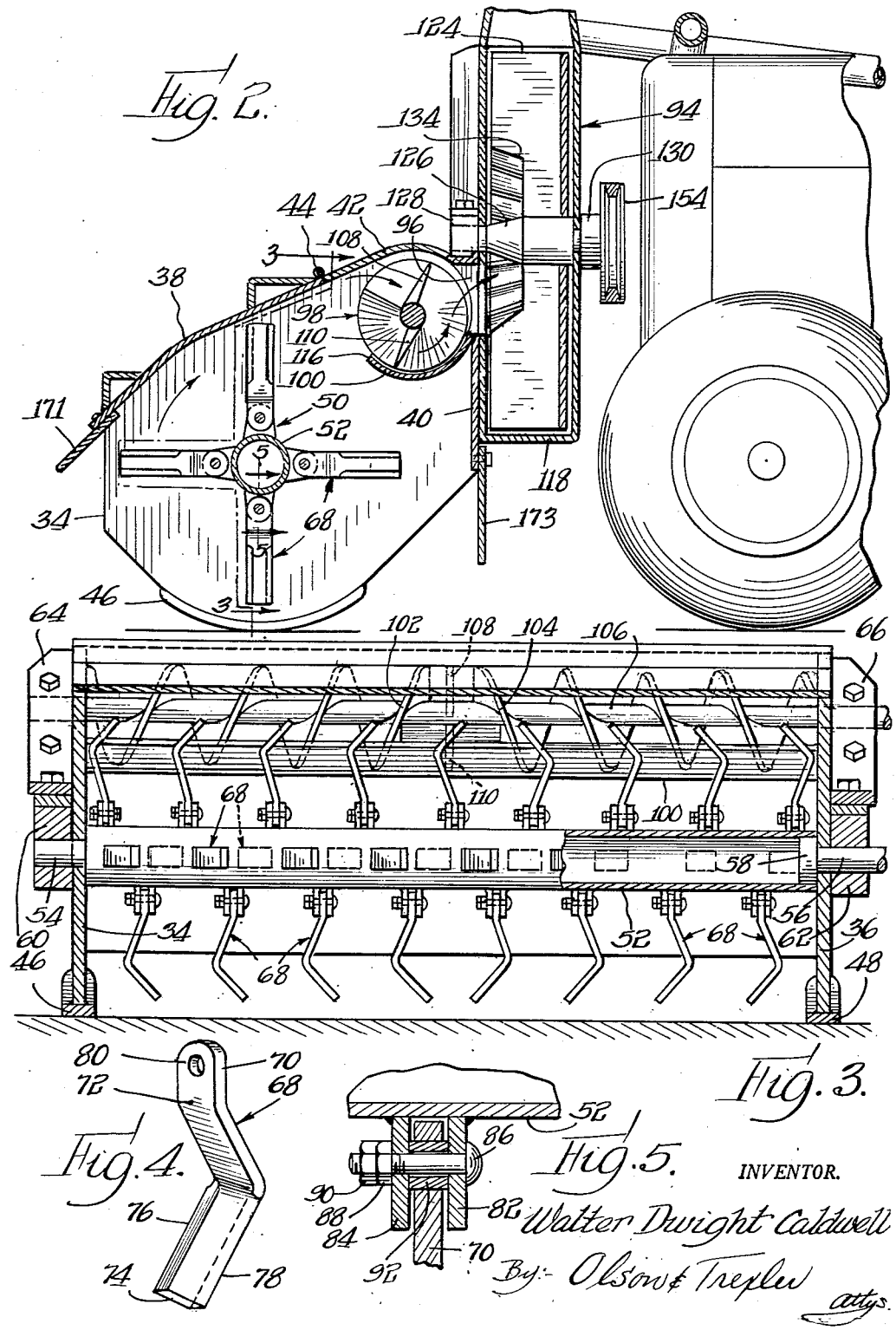

May 27, 1958     W. D. CALDWELL     2,836,023
FORAGE HARVESTER CUTTING MECHANISM
Filed June 30, 1953     3 Sheets-Sheet 3

Fig. 6.

INVENTOR.
Walter Dwight Caldwell
BY Olson & Trexler
attys

United States Patent Office 2,836,023
Patented May 27, 1958

2,836,023

FORAGE HARVESTER CUTTING MECHANISM

Walter Dwight Caldwell, Prairie City, Iowa

Application June 30, 1953, Serial No. 365,109

8 Claims. (Cl. 56—24)

The present invention relates to harvesting machines, and more particularly to harvesting machines of the field type.

Machines have heretofore been employed to harvest a standing crop, and other machines have been designed for harvesting crops which have previously been cut. These prior art machines present certain problems which the present invention overcomes. For example, in using certain of these prior art machines, interference with ground surface irregularities, or engagement with heavy rank growing crops and/or bunches of previous cut crop, tends to stress unduly or jam the machine, thus causing numerous delays. In addition, certain prior art machines are suitable for harvesting only certain types of crops or damage the crops by running over and shattering them.

It is an object of the present invention to provide a novel harvesting machine which will function equally well in harvesting windrowed and swathed forage crops, fresh cut or field dried crops, and standing crops, such as alfalfa, clover, and the grasses which like some of the above mentioned crops may be lodged or entwined in vine-like form, and also such crop residues as corn stalks, straw, and the like. In addition, the novel harvesting apparatus of this invention is useful for harvesting or heading grain to be thrashed. Also, the machine of the present invention will handle with equal facility straight growing firm-type stalks, as well as flexible, limber structures, the latter having a tendency to bend and resist cutting and do the aforesaid harvesting operations without change or adjustment.

Another object of the present invention is to provide a novel harvester which is free from operating difficulties caused by irregularities in the terrain and is extremely simple while highly efficient in operation.

A further object of the present invention is to provide a harvester which, while extremely simple in structure and incorporating a minimum number of operating parts, is adapted to accomplish its intended purpose of a field harvester regardless of the nature of the crop to be harvested or the contour of the ground over which the harvester must be moved without change or adjustment or attachments.

Another object of the present invention is to provide a novel harvester of the type set forth above with means for rendering the structure which initially engages the crop self-adjusting to meet variations in ground contour and thereby avoid any danger of subjecting the machine to overload conditions, severe stresses, shocks, and the like.

Another object of the present invention is to provide in a field harvester capable of being moved across the surface of the soil improved novel means for continuously acting upon the crop or crop residue, which means not only gathers the crop for the purpose of crushing and directing it for ultimate delivery to a suitable discharge point, but also actually cuts the crop so gathered to condition the crop for easy handling and to insure against any possible lodging or jamming within the machine as the crop is moved quickly from its position adjacent the ground through the moving parts of the machine and ultimately to its point of delivery.

A more specific object of the present invention is to provide a novel pivotally supported series of rotary knives adapted primarily for use in a harvester of the type contemplated herein.

Other objects and advantages of the present invention will be apparent from the following description and the accompanying drawings, wherein:

Fig. 2 is an enlarged fragmentary vertical cross section taken along line 2—2 in Fig. 1;

Fig. 3 is a vertical cross sectional view taken along line 3—3 in Fig. 2;

Fig. 4 is an enlarged perspective view showing a novel element of this invention;

Fig. 5 is an enlarged fragmentary cross sectional view taken along line 5—5 in Fig. 2; and Fig. 6 is a fragmentary perspective view of a harvesting machine embodying the principles of this invention.

Figure 1:
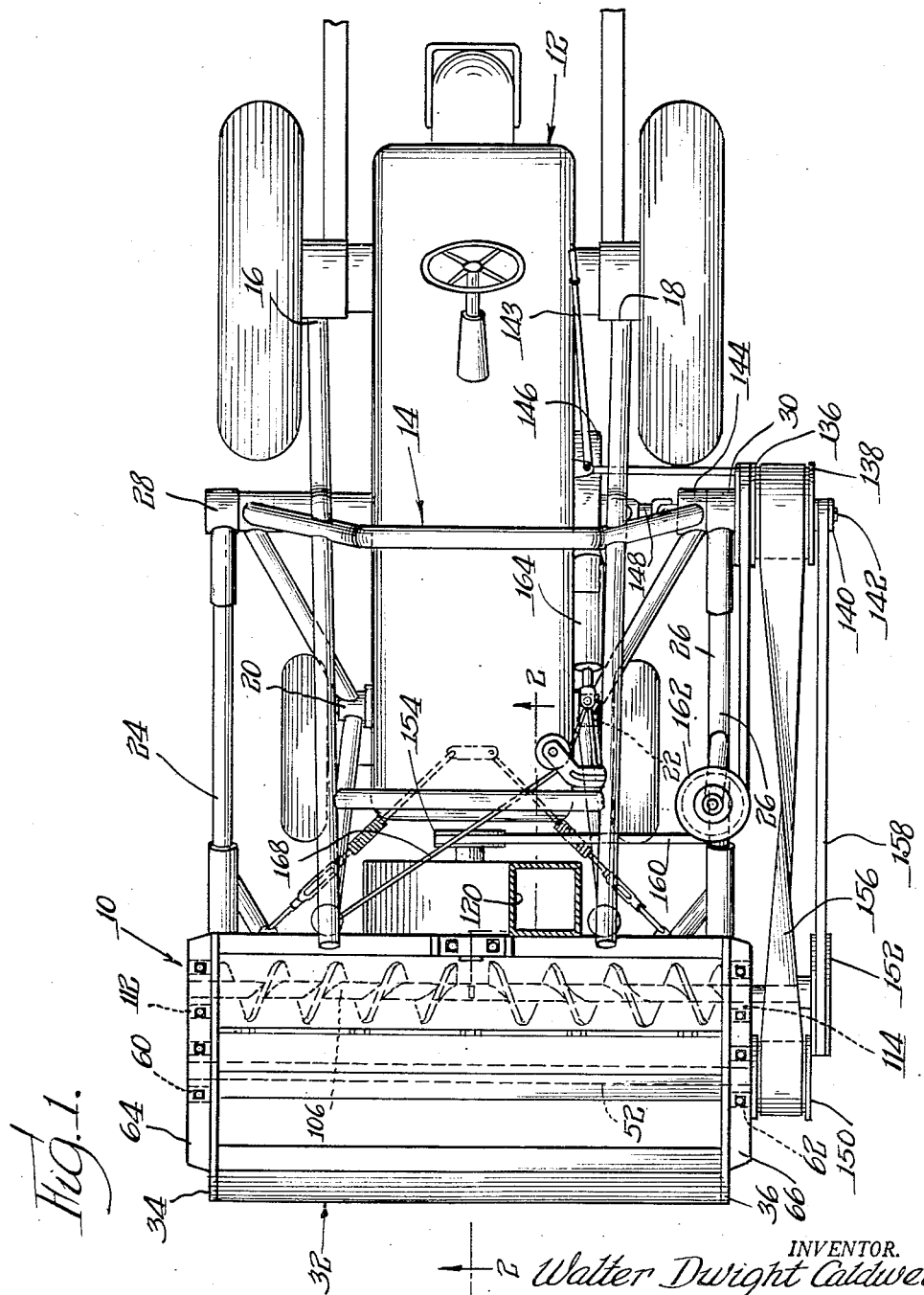
Fig. 1 is a plan view showing a novel harvesting machine embodying the principles of this invention mounted on a tractor.

Referring now more specifically to the drawings, wherein like parts are designated by the same numerals throughout the various figures, a harvesting machine 10 embodying the principles of this invention is shown as mounted on a tractor 12. The tractor 12 may be of any suitable conventional design and need not be described.

The harvesting machine 10 is mounted on the tractor by means of a frame 14. The frame 14 forms no part of the invention claimed herein and need not be described in detail. It suffices to say that the frame 14 includes a plurality of tubular pipes which are welded together and secured to the tractor, as at 16, 18, 20, and 22. Preferably, these points of connection with the tractor are adjacent the tractor axles as illustrated. A pair of boom sticks 24 and 26 are pivotally mounted by suitable means to opposite sides of the frame 14, as at 28 and 30, respectively. It should be noted that these boom sticks extend forwardly beyond the front end of the tractor and that the harvesting apparatus 10 is connected between the boom sticks in advance of the tractor.

The harvesting apparatus includes a housing 32, which housing has a pair of opposed end plates 34 and 36 preferably constructed of steel plates. As shown best in Figs. 2 and 3, the lower portion of the housing is open, and the upper portion is partially closed by suitably shaped steel plates 38 and 40. These plates 38 and 40 are securely attached directly to the end plates of the housing. As shown in Figs. 2 and 6, a door 42 is hinged to the plate 38 by suitable hinge means, as at 44, in order to provide access to the interior of the housing. Skid members 46 and 48 are secured as by welding to the lower edges of the end plates 34 and 36, respectively, for guiding the housing over the ground. These skids are preferably formed from steel which has been heat treated to provide high wear resistance characteristics.

Rotatable means 50 is mounted transversely between the end plates of the housing for initially cutting or picking up the crops. This rotatable means includes a hollow shaft 52 which is supported at its opposite ends by axles 54 and 56. As shown in Fig. 3, the axle 56 includes an enlarged shoulder 58 adapted to fit snugly within the hollow shaft 52. The axle 54 is provided with an identical enlarged shoulder. The hollow shaft 52 is connected with the axles 54 and 56 to prevent relative rotation therebetween by any suitable means, such as keys or bolts, not shown. The axles 54 and 56 are rotatably supported in suitable bearings 60 and 62, which bearings are bolted or otherwise secured to flanges 64 and 66 extending from the housing end plates 34 and 36, respectively. The flanges 64 and 66 are preferably welded directly to the end plates. A plurality of harvesting member 68 are mounted on the rotatable shaft 52 for initially picking up the crops, cutting and directing the crops toward the upper portion of the housing, as more fully described hereinbelow.

Referring particularly to Fig. 4, it will be seen that each of the harvesting or cutter members comprises an intermediate shank portion 72 and an aperture 80 through an attachment inner end portion 70 thereof for mounting the cutter. The shank portion is bent to extend diagonally in one direction, and a blade portion with cutting edges 76, 78 extends from the shank portion diagonally in an opposite direction. The diagonal shank portion extends at an angle such as to prevent fouling of the cutting member with the crops. The blade portion also extends at an angle such as to prevent fouling, and, in addition, to bring the blade portion in line with the attachment section of the cutting member. The angular disposition of the shank and blade portions of the cutting member is also selected to provide the desired cutting action without undue resistance or entanglement, promote gentle handling of dry hay and the like as the members engage the crops, and to direct the harvested crops to suitable crop directing or discharge means. The cutter members are preferably formed from bars of steel having a flat rectangular cross section and the blade portion is provided with sharpened cutting edges 76 and 78.

As shown in Figs. 2 and 3, the cutter members 68 are mounted in a plurality of rows extending axially of the shaft 52 and spaced evenly around the periphery of the shaft. In order to provide in effect a continuous cutting edge along the entire length of the shaft 52, the cutting members 68 in one row are offset axially with respect to the cutting members in the other rows. In addition, the cutting members are arranged so that said blade portions of each cutting member overlap the blade portions of other cutting members disposed axially on opposite sides and in other rows than said first mentioned cutting member. With the cutting members mounted as shown in Fig. 3, it is seen that the shank portion of each of the cutting members diverges in one direction, and the blade portion of each of the cutting members diverges in an opposite direction with respect to the longitudinal axis of the shaft 52. By this diverging or inclined arrangement of the blade portions, the cutting members are enabled to engage the crops during harvesting with a minimum of fouling and entanglement, whereby power requirements are reduced along with reduction in delays caused by jamming of the apparatus. Furthermore, this diverging structure of the cutter blades enables the cutter members to pick up the crops and direct the crops to a suitable corp directing device or means hereinafter fully described without entanglement and consequent fouling of the apparatus. Preferably, the cutter members are arranged with their blade portions disposed so as to direct the cut material to the crop directing device and partially in the direction of movement of the crop in such a directing device. In the exemplary structure, as shown in Fig. 3, the cutter members on one end portion of the rotatable shaft are mounted so that their blade portions extend generally oppositely to the blade portions of the cutter members on the opposite end of the shaft. Another advantage of this arrangement is that in the event one of these sharpened cutting edges on the blade portions of the cutter members becomes dulled, such cutter member may be mounted at the opposite end of the shaft 52 so that its other cutting edge will be used. This enables the apparatus to be operated at peak efficiency throughout considerable periods of time without necessitating removing the blades for sharpening, which would cause considerable delay.

In order to prevent the cutter members from being unduly stressed or broken in the event that they come in contact with uneven ground or an obstacle such as a rock, the cutter members are pivotally mounted on the shaft. The means for mounting the cutter members on the shaft 52 is shown best in Fig. 5. This mounting means includes a pair of spaced plates 82 and 84 secured to the shaft. The plates are provided with suitable aligned apertures for receiving a bolt 86, which bolt is securely tightened and held in place by suitable means, such as a pair of nuts 88 and 90. When mounting the cutter members, the bolt is passed through the aperture 80 in the end portion of the cutter members, and preferably a bushing 92 is first inserted in the aperture 80 in order to prevent undue wear to the cutter member and bolt and allow free swinging action of the cutting member. Since the end portion of each of the cutter members is rounded, as shown best in Fig. 4, it is seen that with the mounting structure described, the cutter members are free to pivot around the bolt 86. During ordinary operation, the cutter members are held in a generally radially extending position by centrifugal force. It should be noted that with the shank portions of the cutter members diverging in one direction and the blade portions diverging in the other, the cutter members are so balanced as to prevent undesirable stresses on the apparatus, and the cutting reactions are absorbed without twisting action. In the event the cutter members strike an obstacle, the centrifugal force is overcome and the cutter members pivot rearwardly, thereby preventing undue stress and breakage. As illustrated, the outer end of the intermediate shank portion is disposed a predetermined distance to one side of a plane normal to the axis of shaft 52 and including the connection between the harvesting members and the shaft. The outer end 74 of the blade portion is disposed on the opposite side of the aforesaid plane substantially the same distance as the outer end of the intermediate shank portion. A balancing effect is thus provided to reduce twisting stresses at the pivotal connection between the harvesting members and the shaft. In the form of the invention shown, the intermediate shank portion and the blade portion are disposed at substantially the same angles, through opposite, to the plane extending through the connection with the shaft and this plane in the form of the invention shown is substantially coincident with the inner end portion 70 of the harvesting members.

In the illustrated structure, the harvested crops are withdrawn from the housing 32 and conveyed to a suitable point of discharge by a blower mechanism generally designated by the numeral 94, which blower mechanism communicates with the housing through a suitable opening 96. In order to gather and direct the harvester crops within the housing towards the opening 96, a conveyor means 98 is provided. The conveyor means includes a shelf or trough 100 which extends between the end plates 34 and 36 of the housing and is preferably attached directly to the end plates. A screw conveyor having right and lefthand screw portions 102 and 104 mounted on shaft 106 is arranged above the trough for directing harvested crops toward the centrally located outlet opening 96. Beater fingers 108 and 110 are mounted on the shaft 106 opposite the outlet opening for agitating the gathered crops and preventing lodging or jamming. The opposite ends of the shaft 106 are rotatably mounted in suitable bearings 112 and 114, which bearings may be bolted or otherwise secured to the flanges 64 and 66, respectively. It should be noted that the trough 100 and the housing walls including the door 42 closely conform to the periphery of the screw conveyor so that substantially all of the crops received by the screw conveyor are continuously acted upon, thereby preventing lodging or jamming of the crops between the peripheral edges of the screw conveyor and the walls of the passageway formed by the trough 100 and the housing. In addition, it should be noted that the free longitudinal edge 116 of the trough 100 is located well below the axis of rotation of the screw conveyor so that the edge 116 defines in combination with the housing a substantially lateral opening to the screw conveyor for receiving the harvested crops from the rotatable means 50. This arrangement prevents unduly large amounts of the harvested crops from building up in the screw conveyor and jamming the apparatus. In order that the harvested crops may be received laterally by the screw conveyor, it is seen that the conveyor is positioned in the upper portion of the housing 32 and preferably at least partially above the uppermost position of the cutter members 68. Since the blade portions of the cutter members are diagonally arranged, the crops will be thrown therefrom and directed laterally toward the screw conveyor as the cutter members pass their uppermost vertical position.

The blower means 94 includes a suitable housing 118 which is welded or otherwise suitably secured to the plate 40 of the housing 32. The blower housing 118 has an inlet opening communicating with the opening 96 and an outlet opening 120 which is provided by suitable duct means 122 which is vertically arranged and communicates tangentially with one side of the blower housing 118, as shown best in Fig. 6. A suitable impeller 124 having a plurality of radially extending blades is mounted on shaft 126 within the blower housing. The opposite ends of the shaft 126 are suitably rotatably mounted in bearings 128 and 130 mounted on opposite sides of the blower housing. It is seen that the opening 96 communicates with the interior of the blower housing below the axis of rotation of the impeller.

In order to obtain the most efficient operation of the impeller, the harvested crops are directed toward its center and to this end, the opening 96 is disposed adjacent the shaft 126 of the impeller. The impeller 124 may be of any suitable design, except that the blades are preferably cut away, as at 134, to provide clearance for the entering material.

In order to drive the various rotatable elements of the novel harvesting apparatus of this invention, a suitable drive pulley assembly is mounted on the frame 14, as shown in Fig. 1. The drive pulley assembly includes pulleys 136, 138, and 140, which are mounted on the shaft 142 journaled in bearings 144 on the frame 14. The drive pulleys may be operatively connected to the shaft 142 by suitable clutch means enclosed in the pulley assembly, not shown, which clutch means may be operated by lever 143. The tractor 12 is provided with a special live lateral power takeoff which is connected to a flywheel 146, and the shaft 142 is connected with the flywheel through suitable flexible coupling means 148. Pulleys 150, 152, and 154 are fixed to the ends of the shafts 56, 106, and 126, respectively, and are driven by belts 156, 158, and 160, which belts are in turn driven by the above mentioned drive pulley assembly. Since the drive pulley assembly is located at one side of the tractor, an idler pulley assembly 162 is mounted on the boomstick 26 for guiding the belt 160 to the blower pulley 154. The rotatable harvesting means 50 must be driven in a clockwise direction, as viewed in Fig. 2, and the screw conveyor must be driven in a counterclockwise direction. In order to obtain this result while driving both members from the same pulley assembly, the belt 156 is twisted, as will be understood by those familiar with the art.

The operation of the apparatus of this invention is as follows. After the tractor has been driven to the location where it is desired to commence the harvesting operation, the harvester 10 is lowered until the skids 46 and 48 are near the ground. The harvester 10 may be raised or lowered by means of a suitable hydraulic cylinder 164 acting through suitable cables 166 and 168, which cables are connected to the rear wall of the housing 32, as shown best in Fig. 6. A pair of pulleys 170 and 172 are mounted on the forward ends of the frame 14 for guiding the cables 166 and 168, respectively.

After the harvesting apparatus is properly positioned, the harvesting means 50, the screw conveyor 98, and the blower are actuated by throwing the clutch lever 143, and the tractor is driven at a uniform rate across the field. As the machine advances, the cutter members cut the crops, and, in addition, pick up the crops and direct them generally laterally toward the screw conveyor 98. During the cutting and chopping of the crops, considerable dust is often raised which might cause the operator on the tractor some inconvenience. In order to substantially restrict such dust to the interior of the harvesting unit, leading and trailing crop engaging members 171 and 173 are provided to close the harvesting unit housing further. These leading and trailing members are made of a resilient material such as rubber to enable them to engage obstacles without injury. The cooperation of the uncut crop or residue, the resilient leading member, the hood or housing, and the inertia of the material being cut, all with the flying cutting members results in a cutting and controlled slinging of the crop or residue to the crop directing means. The harvested crops are received in the screw conveyor and on the trough 100 and are directed by the conveyor toward the housing outlet opening 96. The blower then sucks the crops through the opening 96, after which the crops are blown out of the blower housing through the duct 122. It is, of course, understood that the duct 122 is connected to an extension duct 174, which directs the harvested crops to any suitable point of discharge, such as a truck or trailer. The air drawn from the housing 32 by the blower must, of course, pass through the somewhat restricted lateral opening to the screw conveyor, and thus helps to direct the harvested crops into the screw conveyor.

Preferably, the duct extension or spout 174 includes a vertically extending portion and a generally horizontally extending portion, not shown. In order to enable the duct or spout 174 to be adjusted to direct the crops to any desired point of discharge, means is provided for mounting the spout for rotation through 360°. As shown in Fig. 6, this means includes a plurality of rollers 176 and 177 mounted around the upper end of the duct 122 with the rollers 176 positioned vertically lower than the rollers 177. A collar or track 178 is welded or otherwise secured to the spout 174 for supporting the spout on the rollers 177. A second collar or track 180 is spaced vertically from the track 178 a distance greater than the diameter of the rollers and is disposed for engagement with the bottoms of the rollers 176. The track 180 is connected with the track 178 by a plurality of straps 182, which straps are welded to the tracks. The straps 182 are preferably generally U-shaped and, thus, provide hand grips for enabling an operator to turn the spout.

From the above description, it is seen that the present invention provides a novel harvesting apparatus fully capable of accomplishing the objects heretofore set forth. More particularly, it is seen that the present invention has provided a simple and rugged structure which is capable of efficiently harvesting various types of crops without lodging or jamming of the apparatus and without change or adjustment. Specifically, it is seen that the novel formation and arrangement of applicant's cutter or harvesting members are adapted to act upon standing, swathed, or windrowed crops or crop residues of various types and characteristics for efficiently harvesting the crops and directing the harvested crops toward the screw conveyor without undue power requirements and without becoming fouled by the harvested crops, or jammed or damaged by ground irregularities or foreign objects. In addition, it is seen that the novel structure and arrangement of the screw conveyor in combination with the trough and housing efficiently gathers and directs the harvested crops without lodging and that the crops are directed into the blower in a manner to insure the most efficient operation of the blower. Furthermore, it is seen that harvesting unit housing may be made simply and economically without the use of complicated and expensive frames and braces since sufficient strength and rigidity is provided by connecting the hood, auger trough, and blower housing in the manner illustrated and described.

While the preferred embodiment of the present invention has been shown and described herein, it is obvious that many changes may be made in structural details without departing from the spirit and scope of the appended claims.

I claim:

1. For use with a forage harvester, a cutting mechanism comprising a rotatable shaft, mounting means on said shaft, at least one cutting member having a loose pivotal connection with said mounting means, said cutting member having an attaching portion adjacent said mounting means, an intermediate shank portion extending diagonally from said attaching portion and an outer cutting portion extending reversely diagonally from said shank portion, the center of gravity of said cutting member being in line with said attaching portion, whereby during rotation of said shaft the cutting member will lie in equilibrium from said pivotal connection.

2. For use with a forage harvester, a cutting mechanism as claimed in claim 1, wherein there are provided a plurality of cutting members with the cutting members along one end of the shaft arranged oppositely with respect to the cutting members along the opposite end of the shaft.

3. For use with a forage harvester, a cutting mechanism as claimed in claim 1, wherein there are provided a plurality of cutting members disposed along the shaft in a plurality of rows spaced around the periphery of the shaft and with the cutting members of each row offset axially of the shaft with respect to the cutting members in other rows.

4. For use with a forage harvester, a cutting mechanism as claimed in claim 1, wherein the cutting portion of the cutting member is provided with sharpened edges along opposite sides thereof.

5. For use with a forage harvester, a cutting mechanism as claimed in claim 1, wherein there are provided a plurality of cutting members each having sharpened cutting edges along opposite sides thereof, and wherein the cutting members along one end of the shaft are arranged oppositely with respect to the cutting members along the opposite end of the shaft, whereby a cutting member at one end of the shaft may be removed and attached to the opposite end of the shaft for presenting the opposite cutting edge thereof in working position.

6. For use with a forage harvester, a cutting mechanism as claimed in claim 5, wherein the mounting means comprises separate mounting devices for each cutting member to facilitate removal of individual cutting members from one end of the shaft and attachment thereof to the opposite end of the shaft in reversed position.

7. For use with a forage harvester, a cutting mechanism as claimed in claim 1, wherein the attaching portion is disposed in a plane substantially normal to the axis of rotation of said shaft, and wherein the outer end of shank portion and the outer cutting portion are disposed on opposite sides of the plane of said attaching portion and substantially equidistant therefrom.

8. For use with a forage harvester, a cutting mechanism as claimed in claim 7, wherein the shank portion and the outer cutting portion are disposed at substantially the same opposite angles with respect to the plane of said attaching portion.

References Cited in the file of this patent

UNITED STATES PATENTS

| 1,886,069 | Wanscheer | Nov. 1, 1932 |
| 2,010,312 | McIntire | Aug. 6, 1935 |
| 2,449,592 | Daddario | Sept. 21, 1948 |
| 2,496,493 | Raney | Feb. 7, 1950 |
| 2,506,054 | Agee et al. | May 2, 1950 |
| 2,590,065 | Mott | Mar. 18, 1952 |
| 2,634,567 | Huitema | Apr. 14, 1953 |
| 2,659,188 | Haban | Nov. 17, 1953 |
| 2,663,985 | Hinson | Dec. 29, 1953 |
| 2,675,748 | Patterson | Apr. 20, 1954 |
| 2,684,022 | Smithburn | July 20, 1954 |

FOREIGN PATENTS

| 18,233/24 | Australia | May 19, 1925 |
| 516,114 | Germany | Jan. 19, 1931 |
| 638,459 | Germany | Nov. 16, 1936 |